(12) United States Patent
Jeon (10) Patent No.: US 10,377,359 B2
(45) Date of Patent: Aug. 13, 2019

(54) ELECTRIC BRAKE SYSTEM

(71) Applicant: MANDO CORPORATION, Gyeonggi-do (KR)

(72) Inventor: In-Wook Jeon, Seoul (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 15/489,738

(22) Filed: Apr. 18, 2017

(65) Prior Publication Data

US 2017/0297544 A1    Oct. 19, 2017

(30) Foreign Application Priority Data

Apr. 18, 2016    (KR) .......................... 10-2016-0046911

(51) Int. Cl.
| | | |
|---|---|---|
| *B60T 8/40* | (2006.01) | |
| *B60T 7/04* | (2006.01) | |
| *B60T 8/34* | (2006.01) | |
| *B60T 11/20* | (2006.01) | |
| *B60T 13/68* | (2006.01) | |
| *B60T 13/74* | (2006.01) | |

(52) U.S. Cl.
CPC .............. *B60T 8/409* (2013.01); *B60T 7/042* (2013.01); *B60T 8/341* (2013.01); *B60T 8/4081* (2013.01); *B60T 11/20* (2013.01); *B60T 13/686* (2013.01); *B60T 13/745* (2013.01)

(58) Field of Classification Search
CPC ........ B60T 8/409; B60T 8/341; B60T 8/4081; B60T 13/745; B60T 13/686; B60T 7/042; B60T 11/20
See application file for complete search history.

(56) References Cited

U.S. PATENT DOCUMENTS

| | | | |
|---|---|---|---|
| 2007/0126282 A1 | 6/2007 | Hwang | |
| 2014/0117747 A1* | 5/2014 | Yang ....................... | B60T 7/042 303/6.01 |
| 2014/0117749 A1* | 5/2014 | Yang ....................... | B60T 7/042 303/20 |
| 2015/0166028 A1* | 6/2015 | Kim ....................... | B60T 13/145 303/10 |

FOREIGN PATENT DOCUMENTS

KR    10-2013-0105960    9/2013

* cited by examiner

*Primary Examiner* — Xuan Lan Nguyen
(74) *Attorney, Agent, or Firm* — Ladas & Parry, LLP (57) ABSTRACT

An electric brake system is disclosed. The electric brake system controlling a hydraulic pressure delivered to a wheel cylinder provided at each of wheels according to a pedal effort of a brake pedal, includes a reservoir configured to store oil; a master cylinder including first and second hydraulic ports, each of which is connected to two wheels, and configured to generate a hydraulic pressure by the pedal effort of the brake pedal; a pedal simulator configured to provide a reaction force of the brake pedal by being connected to the master cylinder, and connected to the reservoir; a simulation valve installed at an oil flow path connecting the pedal simulator to the reservoir, or at an oil flow path connecting the master cylinder to the pedal simulator; a bypass flow path branching off from the oil flow path and connected to the reservoir; and a relief valve provided at the bypass flow path and configured to enable oil to flow when the simulation valve operates abnormally.

10 Claims, 6 Drawing Sheets

ELECTRIC BRAKE SYSTEM

This application claims the benefit of Korean Patent Application No. 2016-0046911, filed on Apr. 18, 2016 in the Korean Intellectual Property Office, the disclosure of which is incorporated herein by reference.

BACKGROUND

1. Field

Embodiments of the present disclosure relate to an electric brake system, and more particularly, to an electric brake system capable of stably performing a braking operation even when a simulation valve operates abnormally.

2. Description of the Related Art

A brake system for braking is necessarily mounted on a vehicle, and a variety of systems for providing stronger and more stable braking have been proposed recently.

For example, there are brake systems including an anti-lock brake system (ABS) for preventing a wheel from sliding while braking, a brake traction control system (BTCS) for preventing a driving wheel from slipping when a vehicle is suddenly unintendedly accelerated or intentionally accelerated, an electronic stability control system (ESC) for stably maintaining a driving state of a vehicle by combining an ABS with traction control to control a hydraulic pressure of a brake, and the like.

Such an electric brake system is designed to electronically control a flow of a braking hydraulic pressure, and is used to include a pressure source which receives a braking intent of a driver in the form of an electrical signal from a pedal displacement sensor, which senses a displacement of a brake pedal when the driver steps on the brake pedal, and then supplies a hydraulic pressure to a wheel cylinder.

Also, the electric brake system includes a simulation device capable of providing a driver with a reaction force according to a pedal effort of the brake pedal. At this point, the simulation device is connected to a master cylinder and a reservoir, and a simulation valve is installed at an oil flow path at which the simulation device and the reservoir are connected to each other, or at an oil flow path at which the master cylinder and the simulation device are connected to each other.

Also, when the electric brake system operates abnormally, a backup flow path for connecting the master cylinder to the wheel cylinder is provided to deliver a hydraulic pressure, which is discharged from the master cylinder, to the wheel cylinder, and a cut valve is installed at the backup flow path to control an oil flow. That is, the cut valve is closed while the electric brake system operates normally, and is open while the electric brake system operates abnormally, thereby enabling the hydraulic pressure discharged from the master cylinder to be delivered to the wheel cylinder. At this point, when the electric brake system operates abnormally, the simulation valve is provided to be closed to enable the hydraulic pressure discharged from the master cylinder to be completely delivered to the wheel cylinder such that stable braking may be performed.

However, when a problem occurs at the simulation valve while the electric brake system operates normally, for example, when a high pressure is formed for a short time while rapid braking is performed, or when the simulation valve is adhered and fixed or an electromagnetic force is insufficiently applied to the simulation valve, the simulation valve is provided in a closed state. Therefore, oil inside the simulation device is not delivered to the reservoir according to a brake pedal force and thus the brake pedal does not move so that there occurs a problem in which a braking operation may not be performed.

SUMMARY

Therefore, it is an aspect of the present disclosure to provide an electric brake system capable of performing stable braking by enabling a chamber pressure in a master cylinder to be delivered to a simulation device or a reservoir when a simulation valve operates abnormally.

Additional aspects of the disclosure will be set forth in part in the description which follows and, in part, will be obvious from the description, or may be learned by practice of the disclosure.

In accordance with one aspect of the present disclosure, there may be provided an electric brake system controlling a hydraulic pressure delivered to a wheel cylinder provided at each of wheels according to a pedal effort of a brake pedal, which includes a reservoir configured to store oil; a master cylinder including first and second hydraulic ports, each of which is connected to two wheels, and configured to generate a hydraulic pressure by the pedal effort of the brake pedal; a pedal simulator configured to provide a reaction force of the brake pedal by being connected to the master cylinder, and connected to the reservoir; a simulation valve installed at an oil flow path connecting the pedal simulator to the reservoir, or at an oil flow path connecting the master cylinder to the pedal simulator; a bypass flow path branching off from the oil flow path and connected to the reservoir; and a relief valve provided at the bypass flow path and configured to enable oil to flow when the simulation valve operates abnormally.

In accordance with another aspect of the present disclosure, there may be provided an electric brake system controlling a hydraulic pressure delivered to a wheel cylinder provided at each of wheels according to a pedal effort of a brake pedal, which includes a reservoir configured to store oil; a master cylinder including first and second hydraulic ports, each of which is connected to two wheels, and configured to generate a hydraulic pressure by the pedal effort of the brake pedal; a pedal simulator configured to provide a reaction force of the brake pedal by being connected to the master cylinder, and connected to the reservoir; a simulation valve installed at an oil flow path connecting the master cylinder to the pedal simulator; a bypass flow path branching off from the oil flow path and connected to the pedal simulator; and a relief valve provided at the bypass flow path and configured to enable oil to flow when the simulation valve operates abnormally.

Also, the relief valve may be provided in parallel with the simulation valve.

Also, the relief valve may be open when a chamber pressure in the master cylinder is equal to or greater than a predetermined pressure.

Also, the electric brake system may further include a simulation check valve configured to enable the oil to flow from the reservoir to the pedal simulator, from the reservoir to the master cylinder, or from the pedal simulator to the master cylinder when the pedal effort of the brake pedal is released.

Also, the simulation check valve may be provided at a connection flow path connecting the bypass flow path to the oil flow path.

Also, the simulation valve may be configured with a normally closed type solenoid valve that is usually closed and is open when an opening signal is received.

Also, the electric brake system may further include a pedal displacement sensor configured to sense a displacement of the brake pedal; a pressure source connected to the reservoir and configured to output an electrical signal through the pedal displacement sensor when the brake pedal is operated and generate a hydraulic pressure; a hydraulic pressure control unit including first and second hydraulic pressure circuits, each of which is connected to the pressure source through a hydraulic flow path and is configured to receive a hydraulic pressure generated from the pressure source and control a flow of the hydraulic pressure that is delivered to each of the wheel cylinders; and an electronic control unit configured to control the pressure source and valves on the basis of hydraulic pressure information and pedal displacement information.

Also, the hydraulic pressure control unit may be provided with a normally open (NO) type valve configured to control the flow of the hydraulic pressure delivered to each of the wheel cylinders, and a normally closed (NC) type valve configured to control a flow of a hydraulic pressure discharged from each of the wheel cylinders.

Also, the electric brake system may further include a first backup flow path configured to connect the first hydraulic port to a first hydraulic pressure circuit, and a second backup flow path configured to connect the second hydraulic port to a second hydraulic pressure circuit so as to directly deliver the oil to each of the wheel cylinders when the electric brake system operates abnormally; a first cut valve provided at the first backup flow path and configured to control a flow of the oil; and a second cut valve provided at the second backup flow path and configured to control a flow of the oil.

Also, the first and second cut valves may be configured with normally open type solenoid valves that are usually open and are closed when a closing signal is received from an electronic control unit.

BRIEF DESCRIPTION OF THE DRAWINGS

While the present disclosure will be described in detail with reference to the following drawings, since these drawings show preferred embodiments of the present disclosure, the technical spirit of the present disclosure should not be construed as being limited to these drawings.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

Figure 1:
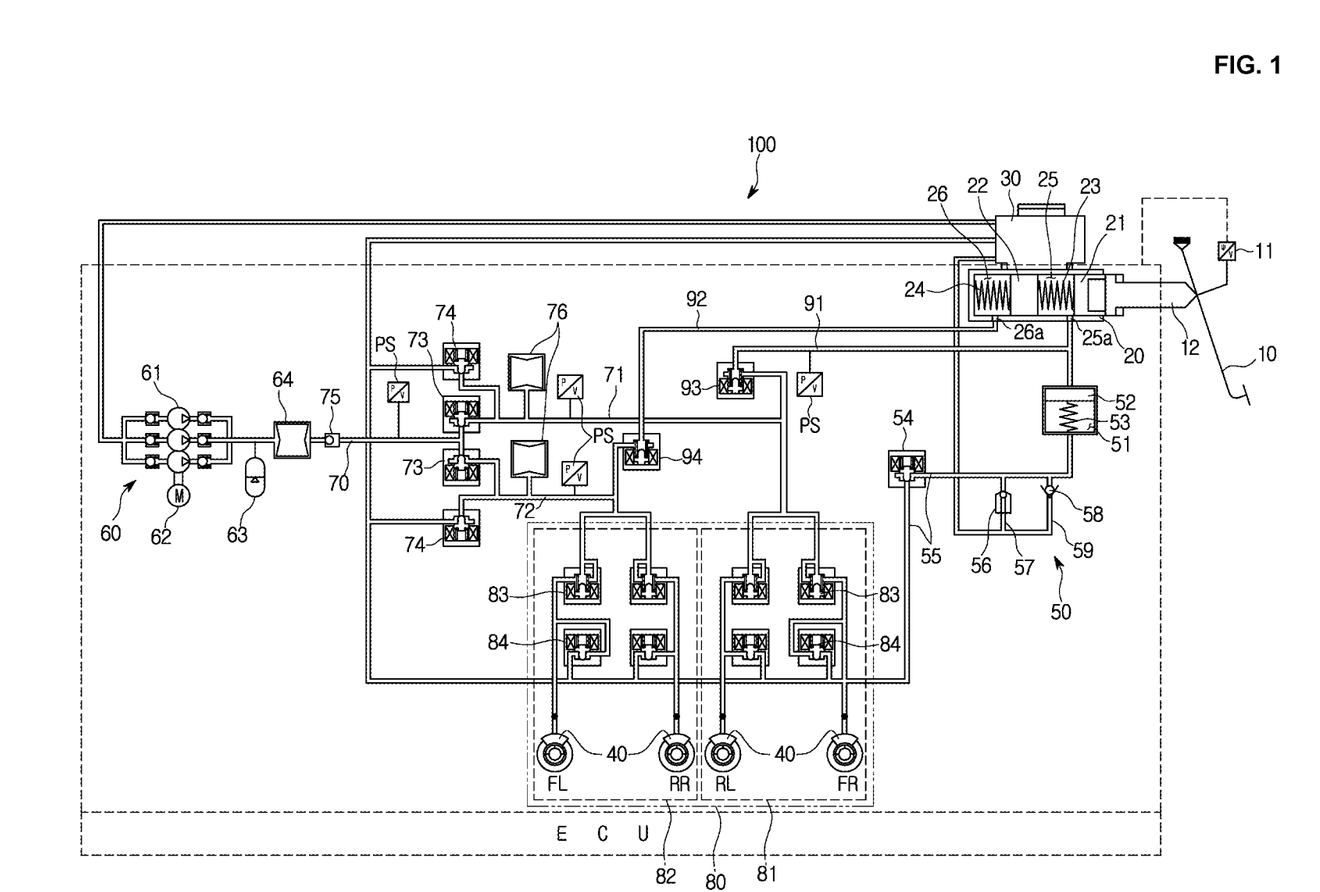
FIG. 1 is a hydraulic pressure circuit diagram illustrating an electric brake system according to one embodiment of the present disclosure.

FIG. 1 is a hydraulic pressure circuit diagram illustrating an electric brake system according to one embodiment of the present disclosure.

Referring to FIG. 1, an electric brake system 100 generally includes a master cylinder 20 configured to generate a hydraulic pressure, a reservoir 30 coupled to an upper part of the master cylinder 20 to store oil, an input rod 12 configured to pressurize the master cylinder 20 according to a pedal effort of a brake pedal 10, a wheel cylinder 40 configured to receive the hydraulic pressure and perform braking of each of wheels RR, RL, FR, and FL, a pedal displacement sensor 11 configured to sense a displacement of the brake pedal 10, a simulation device 50 configured to provide a reaction force according to the pedal effort of the brake pedal 10, and a relief valve 56 configured to provide an oil flow when a simulation valve 54, which is provided at the simulation device 50, operates abnormally.

The master cylinder 20 may be configured with at least one chamber to generate a hydraulic pressure. As shown in the drawing, a first piston 21 and a second piston 22 are installed at the master cylinder 20 to form two chambers 25 and 26. The first piston 21 comes into contact with the input rod 12. In the case of failure to secure safety, the master cylinder 20 is configured to have the two chambers 25 and 26. For example, a first chamber 25 of the two chambers 25 and 26 is connected to a front right wheel FR and a rear left wheel RL, and a second chamber 26 thereof is connected to a front left wheel FL and a rear right wheel RR. Otherwise, the first chamber 25 of the two chambers 25 and 26 may be connected to the two front wheels FR and FL and the second chamber 26 thereof may be connected to the two rear wheels RR and RL. As is described above, the two chambers 25 and 26 may be independently configured so that braking of a vehicle may be possible even when one of the two chambers 25 and 26 fails. First and second hydraulic ports 25a and 26a are formed at such a master cylinder 20, thereby enabling a hydraulic pressure to be respectively discharged from the first and second chambers 25 and 26.

Also, a first spring 23 is disposed between the first piston 21 and the second piston 22 of the master cylinder 20, and a second spring 24 is provided between the second piston 22 and an end part of the master cylinder 20. That is, the first spring 23 and the second spring 24 are respectively provided at the two chambers 25 and 26, and an elastic force is stored in the first spring 23 and the second spring 24 while the first piston 21 and the second piston 22 are compressed. This elastic force pushes and returns the first and second pistons 21 and 22 to their original positions when a force pushing the first piston 21 is less than the elastic force.

Meanwhile, the input rod 12 pressurizing the first piston 21 of the master cylinder 20 comes into close contact with the first piston 21 such that there is no gap between the master cylinder 20 and the input rod 12. That is, when the brake pedal 10 is stepped on, the master cylinder 20 is directly pressurized without a pedal dead stroke section.

The simulation device 50, which is configured to provide a reaction force according to the pedal effort of the brake pedal 10, is connected to a first backup flow path 91 which will be described below. As shown in the drawing, the simulation device 50 includes a simulation chamber 51 provided to store oil flowing from the first hydraulic port 25*a* of the master cylinder 20, a reaction force piston 52 provided inside the simulation chamber 51, a pedal simulator provided with a reaction force spring 53 elastically supporting the reaction force piston 52, and the simulation valve 54 connected to a rear end part of the simulation chamber 51. At this point, the reaction force piston 52 and the reaction force spring 53 are respectively installed to have a predetermined range of displacement within the simulation chamber 51 by oil flowing therein. Meanwhile, the simulation valve 54 is illustrated to be connected to a rear end part of the pedal simulator, but is not limited thereto, and it may be connected to a front end part of the pedal simulator. A structure in which the simulation valve 54 is connected to the front end part of the pedal simulator will be described again below.

The simulation valve 54 may be provided at an oil flow path 55 connecting the rear end part of the simulation chamber 51 to the reservoir 30. That is, an inlet of the simulation chamber 51 is connected to the master cylinder 20, the rear end part of the simulation chamber 51 is connected to the simulation valve 54, and the simulation valve 54 is connected to the reservoir 30. Therefore, even when the reaction force piston 52 returns, oil in the reservoir 30 may flow in the simulation chamber 51 through the simulation valve 54 so that an inside of the simulation chamber 51 is entirely filled with the oil.

Such a simulation valve 54 may be configured with a normally closed type solenoid valve that usually maintains a closed state. The simulation valve 54 is open when the driver steps on the brake pedal 10. Consequently, a pressure generated from the first chamber 25 of the master cylinder 20 is delivered to the pedal simulator so that the oil in the simulation chamber 51 flows to the reservoir 30 through the simulation valve 54.

Also, a simulation check valve 58 may be installed to be connected in parallel with the simulation valve 54 between the pedal simulator and the reservoir 30. The simulation check valve 58 is configured to enable oil to flow from the reservoir 30 to only the simulation chamber 51. That is, the reaction force piston 52 of the pedal simulator pressurizes the reaction force spring 53 and thus the oil in the simulation chamber 51 is delivered to the reservoir 30 through the simulation valve 54. Therefore, since the inside of the simulation chamber 51 is in a state in which the oil is filled therein, friction of the reaction force piston 52 is minimized when the simulation device 50 operates, and thus durability of the simulation device 50 is improved and further the simulation device 50 has a structure in which introduction of foreign materials from the outside is blocked.

In addition, when the pedal effort of the brake pedal 10 is released, the oil is supplied to the simulation chamber 51 through the simulation check valve 58 and thus a rapid return of a pressure in the pedal simulator is ensured.

Such a simulation check valve 58 is provided at a connection flow path 59 configured to connect a bypass flow path 57, which is provided between the pedal simulator and the simulation valve 54 and will be described below, to the oil flow path 55.

In accordance with one aspect of the present disclosure, the relief valve 56 is provided to enable the oil to flow when the simulation valve 54 operates abnormally. The relief valve 56 is configured to be open when a pressure in the master cylinder 20, that is, in the first chamber 25 is equal to or greater than a predetermined pressure. Particularly, the relief valve 56 is configured to be open when a difference in pressure between the first chamber 25 and the pedal simulator is equal to or greater than a predetermined pressure. For example, the relief valve 56 is provided to be open when the difference in pressure occurs in the range of 50 bar to 100 bar. The relief valve 56 is provided to be connected in parallel with the simulation valve 54. More particularly, the relief valve 56 is provided at the bypass flow path 57 which branches off from the oil flow path 55 and is connected to the reservoir 30. The bypass flow path 57 branches off from the oil flow path 55 between the pedal simulator and the simulation valve 54. Therefore, when the simulation valve 54 operates normally, a hydraulic pressure generated from the pedal simulator is delivered to the reservoir 30 through the simulation valve 54, and, when the simulation valve 54 operates abnormally, the pressure in the first chamber 25 is increased and thus the relief valve 56 is open such that the hydraulic pressure is delivered to the reservoir 30 through the relief valve 56.

Figure 3:
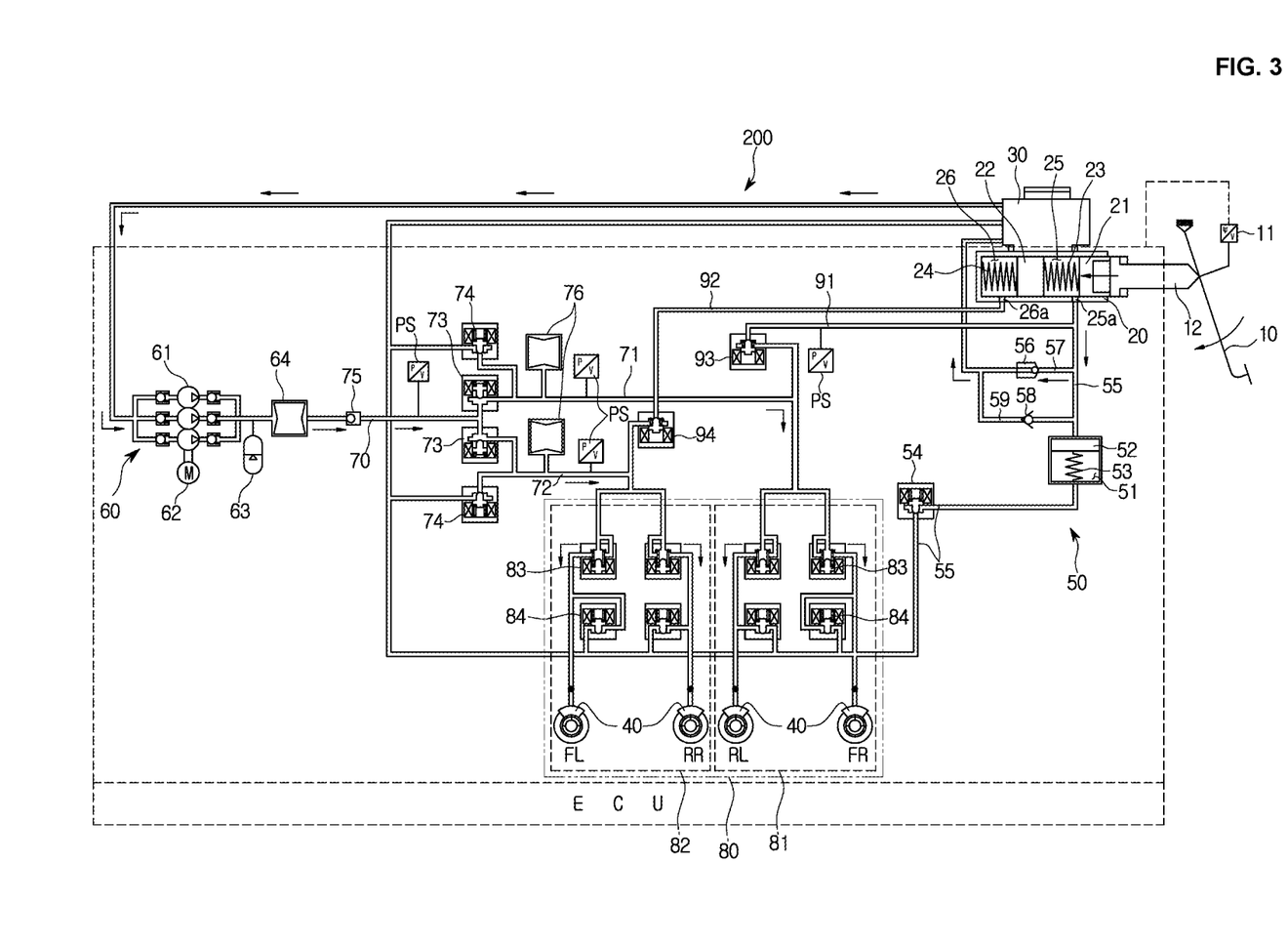
FIG. 3 is a hydraulic pressure circuit diagram illustrating an electric brake system according to another embodiment of the present disclosure.

That is, the reason for providing the above described relief valve 56 is that the brake pedal 10 is prevented from being locked when the simulation valve 54 operates abnormally. Therefore, the relief valve 56 may be connected to any position as long as it prevents the brake pedal 10 from being locked when the simulation valve 54 operates abnormally. For example, FIG. 3 illustrates a hydraulic pressure circuit diagram of an electric brake system according to another embodiment of the present disclosure. Here, a reference number the same as that in the above-described drawings refers to a member performing the same function.

Referring to FIG. 3, an electric brake system 200 according to the present embodiment is provided such that the relief valve 56 is connected to the front end part of the pedal simulator. More particularly, the relief valve 56 is provided at the bypass flow path 57 which branches off from the oil flow path 55 connecting between the master cylinder 20 and the pedal simulator, and is connected to the reservoir 30. That is, when the simulation valve 54 operates abnormally, a hydraulic pressure discharged from the first chamber 25 of the master cylinder 20 is enabled to be directly delivered to the reservoir 30 through the relief valve 56 such that a phenomenon in which the brake pedal 10 is locked may be prevented.

Meanwhile, the relief valve 56 is connected to the front end part of the pedal simulator so that the simulation check valve 58 is provided to enable oil to flow from the reservoir 30 to the master cylinder 20 when a pedal effort of the brake pedal 10 is released. The simulation check valve 58 is provided at the connection flow path 59 configured to connect the bypass flow path 57 to the oil flow path 55. Here, the connection flow path 59 is illustrated and described to be connected to the bypass flow path 57, which is connected to the reservoir 30, but is not limited thereto, and it may be directly connected to the reservoir 30.

Referring back to FIG. 1, the electric brake system 100 according to one embodiment of the present disclosure includes a pressure source 60 configured to receive a braking intent of a driver in the form of an electrical signal from the pedal displacement sensor 11, which senses a displacement of the brake pedal 10, and to operate mechanically, a hydraulic pressure control unit 80 including first and second hydraulic pressure circuits 81 and 82 connected to the pressure source 60 through a hydraulic flow path 70 and configured to receive a hydraulic pressure generated from the pressure source 60 and control a flow of a hydraulic pressure which is delivered to the wheel cylinders 40, a first cut valve 93 provided at the first backup flow path 91 connecting the first hydraulic port 25a to the first hydraulic pressure circuit 81 and configured to control the flow of the hydraulic pressure, a second cut valve 94 provided at a second backup flow path 92 connecting the second hydraulic port 26a to the second hydraulic pressure circuit 82 and configured to control the flow of the hydraulic pressure, and an electronic control unit (ECU) configured to control the pressure source 60 and valves 54, 73, 74, 83, 84, 93, and 94 on the basis of hydraulic pressure information and pedal displacement information.

The pressure source 60 is provided with one or more pumps 61, which are connected to the reservoir 30 and are configured to pump oil flowing in from the reservoir 30 to a high pressure and to form a braking pressure, and a motor 62 configured to provide a driving force to the one or more pumps 61. At this point, the motor 62 may operate by receiving a braking intent of a driver according to a pedal effort of the brake pedal 10 from the pedal displacement sensor 11. That is, a signal, which is sensed by the pedal displacement sensor 11, is transmitted to the ECU, and the ECU controls the motor 62 on the basis of the sensed signal.

A hydraulic pressure discharged from such a pressure source 60 is temporarily stored in an accumulator 63 which is provided at an outlet side of each of the one or more pumps 61, and then is delivered to each of the hydraulic pressure circuits 81 and 82 through the hydraulic flow path 70. More particularly, the hydraulic flow path 70 is connected to each of the hydraulic pressure circuits 81 and 82 through inflow paths 71 and 72.

The inflow paths 71 and 72 are classified into a first inflow path 71 connected to the first hydraulic pressure circuit 81, and a second inflow path 72 connected to the second hydraulic pressure circuit 82. An inlet valve 73 and an outlet valve 74 are respectively provided at the first and second inflow paths 71 and 72 to control brake oil stored in the accumulator 63. That is, the brake oil may be delivered to each of the wheel cylinders 40 through the first inflow path 71 and the second inflow path 72.

Each of the inlet valve 73 and the outlet valve 74 is configured with a normally closed type solenoid valve that usually maintains a closed state, and, when the driver steps on the brake pedal 10, the inlet valve 73 is open and thus the brake oil stored in the accumulator 63 is delivered to each of the wheel cylinders 40, and the outlet valve 74 is provided in a closed state.

Meanwhile, an undescribed reference number '64' is a diffuser provided at the hydraulic flow path 70, an undescribed reference number '75' is a check valve, and an undescribed reference number 'PS' is a pressure sensor. Also, an undescribed reference number '76' is a pulsation attenuation device which is provided at each of the first inflow path 71 and the second inflow path 72 and is configured to minimize a pressure pulsation.

The hydraulic pressure control unit 80 is configured with the first hydraulic pressure circuit 81 and the second hydraulic pressure circuit 82, each of which receives a hydraulic pressure and controls two wheels. As shown in the drawing, two wheels controlled by the first hydraulic pressure circuit 81 may be configured with the front right wheel FR and the rear left wheel RL, and another two wheels controlled by the second hydraulic pressure circuit 82 may be configured with the front left wheel FL and the rear right wheel RR. The wheel cylinder 40 is installed at each of such wheels FR, FL, RR, and RL to perform braking by receiving the hydraulic pressure. That is, the hydraulic pressure control unit 80 receives the hydraulic pressure from the pressure source 60 through the inflow paths 71 and 72 respectively connected to the first and second hydraulic pressure circuits 81 and 82, and each of the first and second hydraulic pressure circuits 81 and 82 is provided with a plurality of valves 83 and 84 which are configured to control a flow of the hydraulic pressure.

As shown in the drawing, the plurality of valves 83 and 84 are classified into a normally open type (hereinafter, referred to as an 'NO type') solenoid valve 83 disposed at an upstream side of each of the wheel cylinders 40 and configured to control delivery of a hydraulic pressure to each of the wheel cylinders 40, and a normally closed type (hereinafter, referred to as an 'NC type') solenoid valve 84 disposed at a downstream side of each of the wheel cylinders 40 and configured to control discharge of a hydraulic pressure from each of the wheel cylinders 40. Opening and closing operations of such solenoid valves 83 and 84 may be controlled by the ECU which is typically used.

The first and second backup flow paths 91 and 92 are provided to directly supply the oil in the master cylinder 20 to the wheel cylinders 40 when the electric brake system 100 operates abnormally. More particularly, the first cut valve 93 configured to control an oil flow is provided at the first backup flow path 91, and the second cut valve 94 configured to control an oil flow is provided at the second backup flow path 92. Also, the first backup flow path 91 is connected to the first hydraulic port 25a and the first hydraulic pressure circuit 81, and the second backup flow path 92 is connected to the second hydraulic port 26a and the second hydraulic pressure circuit 82.

The first and second cut valves 93 and 94 are respectively configured with an NO type solenoid valve that is usually open and is closed when a closing signal is received from the ECU.

Next, a state in which the electric brake system 100 configured as described above operates for braking normally will be described in brief below.

First, when a driver begins braking, an amount of braking requested by the driver may be sensed through the pedal displacement sensor 11 on the basis of information including a pressure applied to the brake pedal 10 by the driver, and the like. The ECU receives an electrical signal output from the pedal displacement sensor 11 to drive the motor 62. Thus, the one or more pumps 61 connected to the reservoir 30 receive oil therefrom, and then discharge the oil through a pumping operation to deliver a hydraulic pressure to the wheel cylinders 40 of each of the hydraulic pressure circuits 81 and 82. At this point, the first and second cut valves 93 and 94, which are installed at the first and second backup flow paths 91 and 92 respectively connected to the first and second hydraulic ports 25a and 26a of the master cylinder 20, are closed so that the hydraulic pressure generated in the master cylinder 20 is not delivered to the wheel cylinders 40.

Meanwhile, the pressure generated by a pressurization of the master cylinder 20 according to the pedal effort of the brake pedal 10 is delivered to the pedal simulator connected to the master cylinder 20. At this point, the simulation valve 54, which is installed at the oil flow path 55 connecting the rear end part of the simulation chamber 51 to the reservoir 30, is open so that the oil filled in the simulation chamber 51 is delivered to the reservoir 30 through the simulation valve 54. Also, a pressure corresponding to weights of the reaction force piston 52 and the reaction force spring 53 supporting the reaction force piston 52 provides an appropriate pedal feeling to the driver through the simulation chamber 51. In addition, when the pedal effort of the brake pedal 10 is released, the oil is refilled in the simulation chamber 51 through the simulation check valve 58 and thus a rapid return of a pressure in the pedal simulator is ensured.

Next, a state in which a simulation valve provided at an electric brake system according to one aspect of the present disclosure operates abnormally will be described with reference to FIG. 2.

Figure 2:
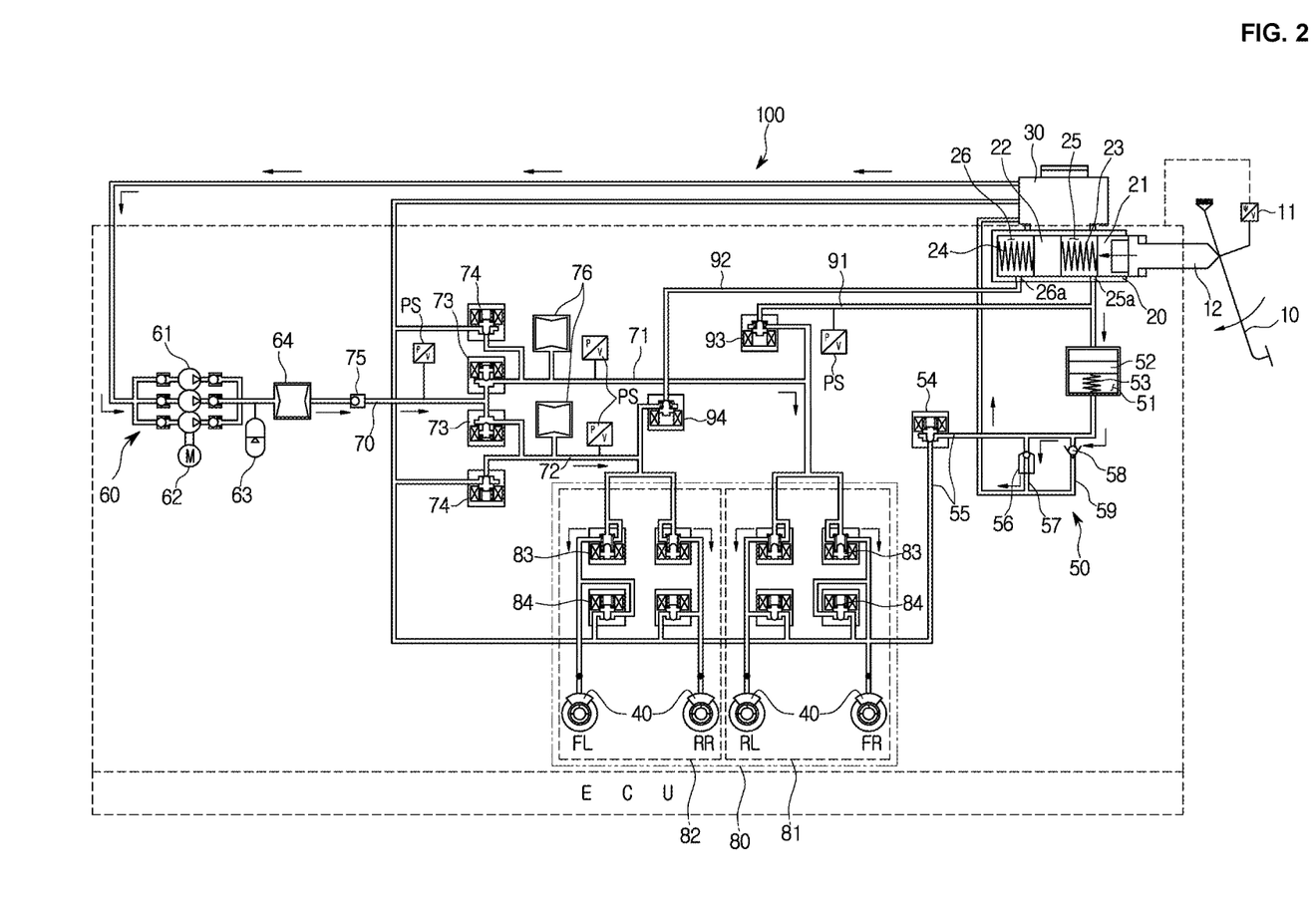
FIG. 2 is a hydraulic pressure circuit diagram illustrating a state in which a simulation valve of the electric brake system according to one embodiment of the present disclosure operates abnormally.

Referring to FIG. 2, a pressure, which is generated while the master cylinder 20 is pressurized according to the pedal effort of the brake pedal 10, should be delivered to the pedal simulator, but, when the simulation valve 54 is provided in a closed state instead of being open, an oil flow is blocked such that a movement of the brake pedal 10 is blocked. This is because the cut valves 93 and 94, which are respectively provided at the backup flow paths 91 and 92 respectively connected to the hydraulic ports 25a and 26a of the master cylinder 20, are in a closed state when braking is performed. Thus, since the pedal effort may not be implemented on the brake pedal 10, there occurs a problem in which braking may not be performed.

Consequently, when the simulation valve 54 operates abnormally to be in the closed state, the oil is delivered to the reservoir 30 through the bypass flow path 57 which branches off from the oil flow path 55 connecting the rear end part of the pedal simulator to the simulation valve 54. That is, the relief valve 56 provided at the bypass flow path 57 is open to enable the oil to flow such that the brake pedal 10 is movable. Therefore, stable braking may be performed.

Meanwhile, the relief valve 56 may be configured to enable the oil to flow only when the simulation valve 54 operates abnormally. For example, the relief valve 56 is provided to be open when a pressure in the first chamber 25 of the master cylinder 20 is equal to or greater than a predetermined pressure, when a pressure in the simulation chamber 51 of the pedal simulator is equal to or greater than a predetermined pressure, or when a difference in pressure between the master cylinder 20 and the pedal simulator occurs to be equal to or greater than a predetermined pressure. That is, the relief valve 56 is provided in a closed state when the simulation valve 54 operates normally.

As is described above, the electric brake systems 100 and 200 are limited to prevent a locking phenomenon of the brake pedal 10 through the relief valve 56 in a state in which the simulation valve 54 is provided at the oil flow path 55 connected to the rear end part of the pedal simulator, but they may be configured to prevent the locking phenomenon of the brake pedal 10 even in a state in which the simulation valve 54 is connected to the front end part of the pedal simulator. For example, a structure in which the simulation valve 54 is connected to the front end part of the pedal simulator is disclosed in FIG. 4.

Figure 4:
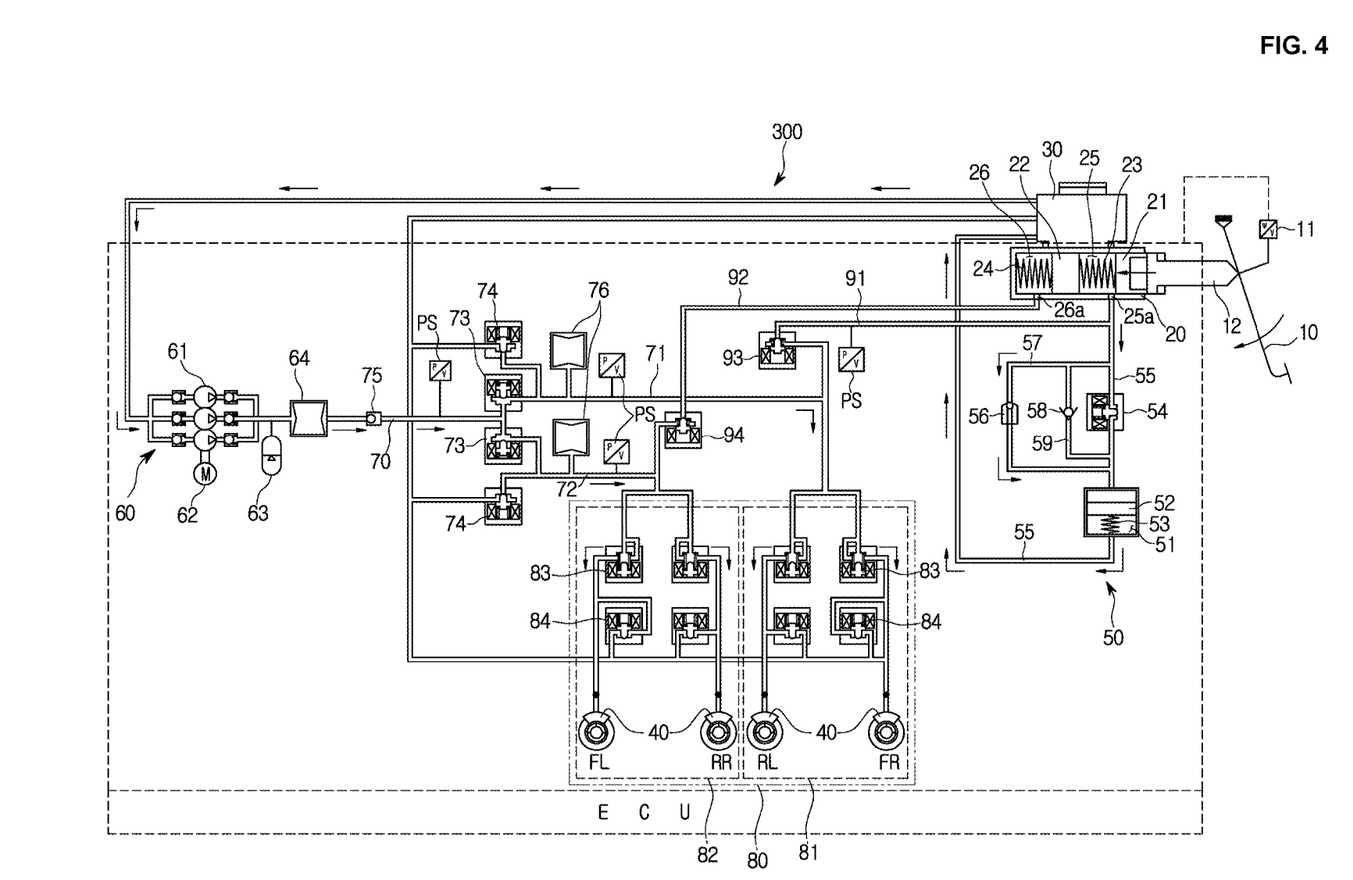
FIG. 4 is a hydraulic pressure circuit diagram illustrating an electric brake system according to still another embodiment of the present disclosure.

FIG. 4 is a hydraulic pressure circuit diagram illustrating an electric brake system according to still another embodiment of the present disclosure. Here, a reference number the same as that in the described above drawings refers to a member performing the same function.

Referring to FIG. 4, an electric brake system 300 according to the present embodiment is provided such that the simulation valve 54 is connected to the front end part of the pedal simulator. More particularly, the simulation valve 54 is provided at the oil flow path 55 connecting the master cylinder 20 to the pedal simulator. Also, the rear end part of the pedal simulator is connected to the reservoir 30. Therefore, a hydraulic pressure generated from the master cylinder 20 according to a pedal effort of the brake pedal 10 is delivered to the pedal simulator through the simulation valve 54. That is, while the pedal simulator is pressurized, oil in the simulation chamber 51 flows to the reservoir 30. Here, to prevent a locking phenomenon of the brake pedal 10 when the simulation valve 54 operates abnormally, the bypass flow path 57 is provided, wherein the bypass flow path 57 branches off from the oil flow path 55 connecting between the master cylinder 20 and the pedal simulator, and is connected to the front end part of the pedal simulator. That is, the bypass flow path 57 is provided to connect between the master cylinder 20 and the simulation valve 54, and between the simulation valve 54 and the pedal simulator. Also, the relief valve 56 is provided at the bypass flow path 57. Therefore, when the simulation valve 54 operates abnormally, the relief valve 56 is open and thus a hydraulic pressure discharged from the first chamber 25 of the master cylinder 20 is enabled to be delivered to the pedal simulator through the relief valve 56 such that a locking phenomenon of the brake pedal 10 may be prevented and further a pedal feeling may be provided to a driver. Here, as is described above, the relief valve 56 may be open when a pressure in the first chamber 25 of the master cylinder 20 is equal to or greater than a predetermined pressure.

Meanwhile, the simulation check valve 58 is provided to enable oil to flow from the pedal simulator to the master cylinder 20 when the pedal effort of the brake pedal 10 is released. This simulation check valve 58 is provided at the connection flow path 59 configured to connect the bypass flow path 57 to the oil flow path 55.

Figure 5:
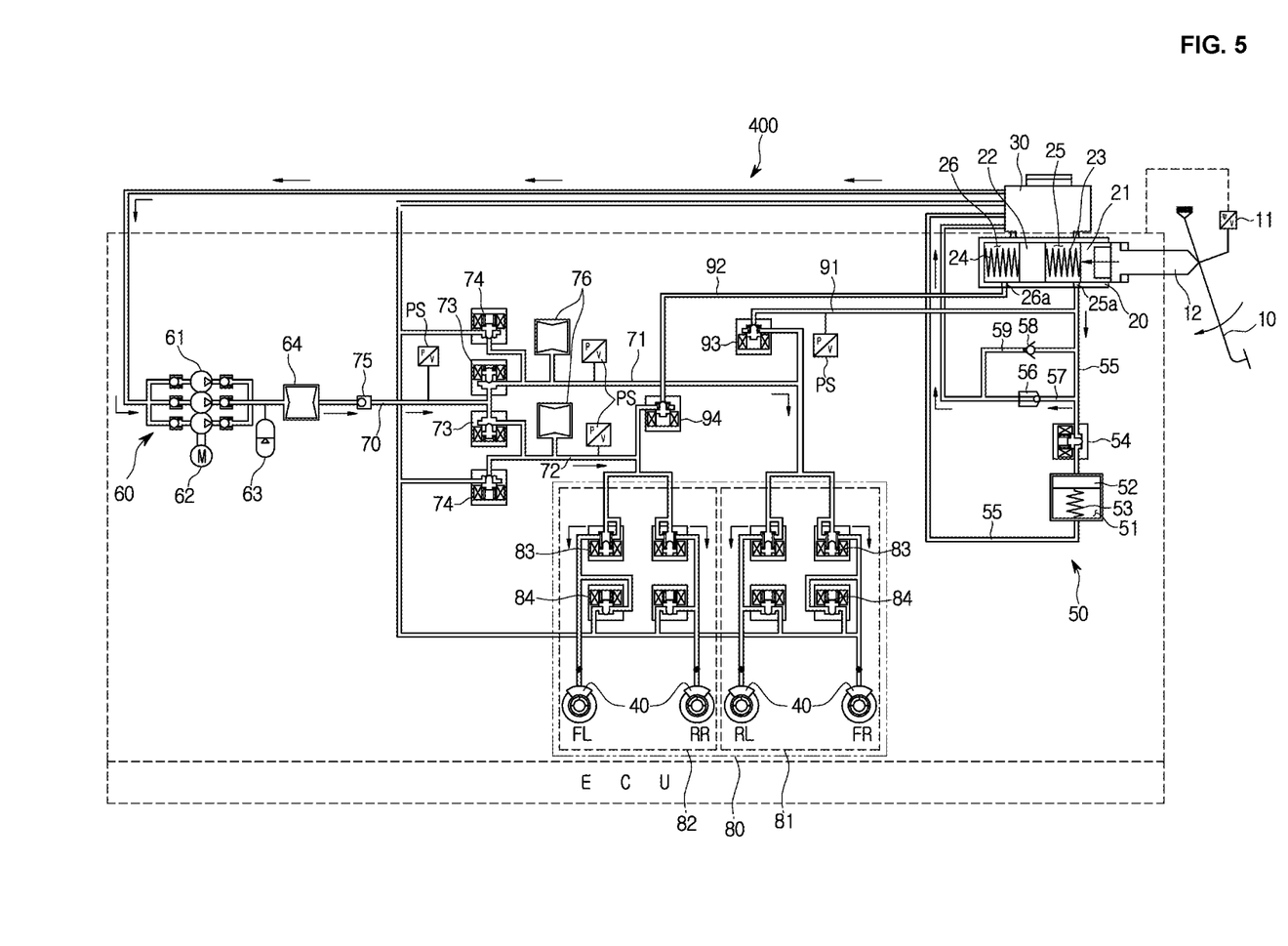
FIG. 5 is a hydraulic pressure circuit diagram illustrating an electric brake system according to yet another embodiment of the present disclosure.

As is described above, when the simulation valve 54 is connected to the front end part of the pedal simulator, it is illustrated and described such that the hydraulic pressure generated from the master cylinder 20 is delivered to the pedal simulator through the bypass flow path 57 and the relief valve 56, but it is not limited thereto, and the hydraulic pressure generated from the master cylinder 20 may be enabled to be directly delivered to the reservoir 30. For example, FIG. 5 illustrates a hydraulic pressure circuit diagram of an electric brake system according to yet another embodiment of the present disclosure. Here, a reference number the same as that in the described above drawings refers to a member performing the same function.

Referring to FIG. 5, in an electric brake system 400 according to the present embodiment, the relief valve 56 is provided at the bypass flow path 57 which branches off from the oil flow path 55 connecting between the master cylinder 20 and the simulation valve 54, and is connected to the reservoir 30. That is, when the simulation valve 54 operates abnormally, a hydraulic pressure discharged from the first chamber 25 of the master cylinder 20 is enabled to be directly delivered to the reservoir 30 through the relief valve 56 such that a phenomenon in which the brake pedal 10 is locked may be prevented.

Meanwhile, the relief valve 56 is directly connected to the reservoir 30 at the front end part of the pedal simulator so that the simulation check valve 58 is provided to enable oil to flow from the reservoir 30 to the master cylinder 20 when a pedal effort of the brake pedal 10 is released. This simulation check valve 58 is provided at the connection flow path 59 configured to connect the bypass flow path 57 to the oil flow path 55. Here, the connection flow path 59 is illustrated and described to be connected to the bypass flow path 57, which is connected to the reservoir 30, but is not limited thereto, and it may be directly connected to the reservoir 30.

Figure 6:
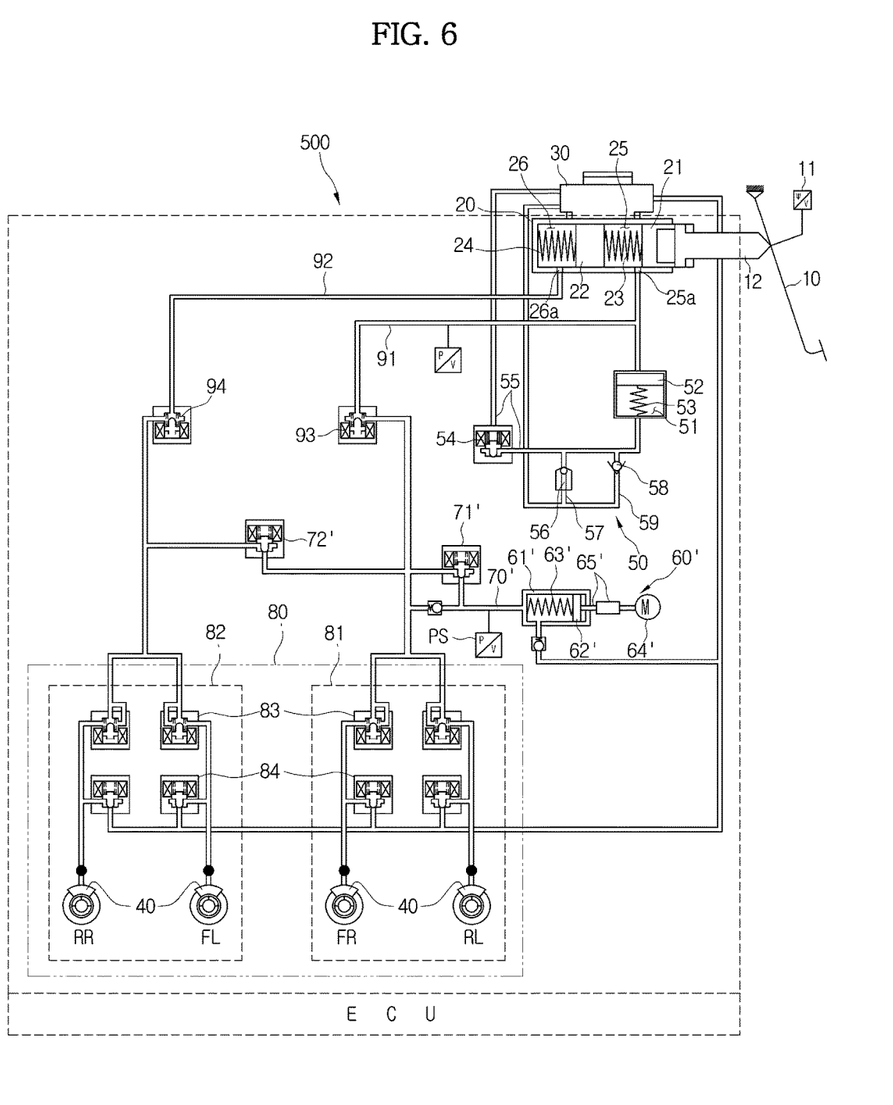
FIG. 6 is a hydraulic pressure circuit diagram illustrating an electric brake system according to still yet another embodiment of the present disclosure.

FIG. 6 is a hydraulic pressure circuit diagram illustrating an electric brake system according to still yet another embodiment of the present disclosure. Here, a reference number the same as that in the described above drawings refers to a member performing the same function.

Referring to FIG. 6, an electric brake system 500 according to the present embodiment includes the master cylinder 20 configured to generate a hydraulic pressure, the reservoir 30 coupled to an upper portion of the master cylinder 20 and configured to store oil, the pedal displacement sensor 11 configured to sense a displacement of the brake pedal 10, the simulation device 50 configured to provide a reaction force according a pedal effort of the brake pedal 10, the relief valve 56 configured to enable oil to flow when the simulation valve 54 provided at the simulation device 50 operates abnormally, a pressure source 60' configured to receive a braking intent of a driver in the form of an electrical signal from the pedal displacement sensor 11 and operate mechanically, the hydraulic pressure control unit 80 including the first and second hydraulic pressure circuits 81 and 82 connected to the pressure source 60' through a hydraulic flow path 70' and configured to receive a hydraulic pressure generated from the pressure source 60' and control a flow of a hydraulic pressure which is delivered to the wheel cylinders 40, the first cut valve 93 provided at the first backup flow path 91 connecting the first hydraulic port 25a to the first hydraulic pressure circuit 81 and configured to control a flow of a hydraulic pressure, the second cut valve 94 provided at the second backup flow path 92 connecting the second hydraulic port 26a to the second hydraulic pressure circuit 82 and configured to control a flow of a hydraulic pressure, and the ECU configured to control the pressure source 60' and valves 54, 71', 72', 83, 84, 93, and 94 on the basis of hydraulic pressure information and pedal displacement information.

That is, the electric brake system 500 according to the present embodiment is different from the above described embodiments only in terms of a configuration of the pressure source 60' and a structure of a hydraulic pressure circuit in which a hydraulic pressure is delivered from the pressure source 60' to each of the hydraulic pressure circuits 81 and 82, and the remaining structure of the electric brake system 500 is the same as that of each of the above described embodiments.

The pressure source 60' is provided with a hydraulic pressure chamber 61' in which a predetermined space is formed to receive and store oil, a hydraulic piston 62' and a hydraulic pressure spring 63' which are provided inside the hydraulic pressure chamber 61', a motor 64' configured to generate a rotational force in response to an electrical signal from the pedal displacement sensor 11, and a power converter 65' configured to convert a rotational movement of the motor 64' into a rectilinear movement to linearly move the hydraulic piston 62'. At this point, the hydraulic pressure chamber 61' is connected to the reservoir 30 and receives oil therefrom. Here, a signal sensed by the pedal displacement sensor 11 is transmitted to the ECU, and the ECU controls the motor 64' on the basis of the sensed signal.

The power converter 65' is a device configured to convert a rotational movement into a rectilinear movement, and, for example, it may be configured with a ball screw nut assembly. For example, the power converter 65' may be configured with a screw which is integrally formed with a rotational shaft (not shown) of the motor 64', and a ball nut which is screw-coupled to the screw in a state in which a rotation of the ball nut is restricted to perform a rectilinear movement according to a rotation of the screw. That is, the screw serves not only as the rotational shaft of the motor 64' but also to enable the ball nut to perform a rectilinear movement. At this point, the hydraulic piston 62' is connected to the ball nut of the power converter 65' to pressurize the hydraulic pressure chamber 61' by the rectilinear movement of the ball nut, and the hydraulic pressure spring 63' serves to return the hydraulic piston 62' to its original position while the ball nut is returned to its original position.

First and second switching valves 71' and 72', which are connected in series to each other and control delivery of a hydraulic pressure to the wheel cylinders 40 through opening and closing operations, are installed at the hydraulic flow path 70' connecting the pressure source 60' to the hydraulic pressure control unit 80. The opening and closing operations of each of the first and second switching valves 71' and 72' are controlled by the ECU, and the first and second switching valves 71' and 72' are configured to be respectively connected to the two hydraulic pressure circuits 81 and 82 and to directly deliver the hydraulic pressure generated from the pressure source 60' to the wheel cylinders 40. That is, the first switching valve 71' is configured to control a hydraulic pressure supplied to the first hydraulic pressure circuit 81, and the second switching valve 72' is configured to control a hydraulic pressure supplied to the second hydraulic pressure circuit 82.

Such first and second switching valves 71' and 72' are respectively configured with an NC type solenoid valve that is usually closed and is open when an opening signal is received from the ECU.

When operating normally, the above-described electric brake system 500 receives an electrical signal from the pedal displacement sensor 11 according to a pedal effort of the brake pedal 10 and delivers a braking hydraulic pressure to the wheel cylinders 40 through the pressure source 60', and further oil, which is delivered from the master cylinder 20 when the first and second cut valves 93 and 94 are closed, provides a reaction force through the simulation device 50 and flows in the reservoir 30 through the simulation valve 54.

Meanwhile, when the simulation valve 54 operates abnormally, similar to the above described embodiments, the electric brake system 500 may be configured to enable oil, which is delivered from the pedal simulator, to flow to the reservoir 30 through the relief valve 56 provided at the bypass flow path 57 such that a movement of the brake pedal 10 may be enabled.

As is apparent from the above description, the electric brake system according to the embodiments of the present disclosure is capable of addressing a problem in which a brake pedal is not moved when a simulation valve performs an incorrect operation and further providing a stable braking force by providing a bypass flow path, which branches off from an oil flow path connecting a pedal simulator to the simulation valve or connecting a master cylinder to the pedal simulator and is connected to a reservoir, and a relief valve that is open when a pressure in the bypass flow path is equal to or greater than a predetermined pressure.

Also, when a brake system fails, a pedal effort of a driver is enabled to be directly delivered to the master cylinder and thus braking of a vehicle may be performed so that a stable braking force may be provided.

As described above, although the present disclosure has been described by way of a specific embodiment and the accompanying drawings, it is not limited thereto, and it should be understood that numerous other changes and modifications can be devised by those skilled in the art that will fall within the spirit and scope of this disclosure and along with the full range of equivalents to which the appended claims are entitled.

What is claimed is:

1. An electric brake system controlling a hydraulic pressure delivered to a wheel cylinder provided at each of wheels according to a pedal effort of a brake pedal, comprising:
a reservoir configured to store oil;
a master cylinder including first and second hydraulic ports, each of which is connected to two wheels, and configured to generate a hydraulic pressure by the pedal effort of the brake pedal;
a pedal simulator configured to provide a reaction force of the brake pedal by being connected to the master cylinder, and connected to the reservoir;
a simulation valve installed at an oil flow path connecting the pedal simulator to the reservoir, or at an oil flow path connecting the master cylinder to the pedal simulator;
a bypass flow path branching off from the oil flow path and connected to the reservoir;
a relief valve provided at the bypass flow path; and
a simulation check valve configured to enable the oil to flow from the reservoir to the pedal simulator, or from the reservoir to the master cylinder when the pedal effort of the brake pedal is released.

2. The electric brake system of claim 1, wherein the relief valve is provided in parallel with the simulation valve.

3. The electric brake system of claim 1, wherein the relief valve is open when a chamber pressure in the master cylinder is equal to or greater than a predetermined pressure.

4. The electric brake system of claim 1, wherein the simulation check valve is provided at a connection flow path connecting the bypass flow path to the oil flow path.

5. The electric brake system of claim 1, wherein the simulation valve is configured with a normally closed type solenoid valve that is usually closed and is open when an opening signal is received.

6. The electric brake system of claim 1, further comprising:
a pedal displacement sensor configured to sense a displacement of the brake pedal;
a pressure source connected to the reservoir and configured to output an electrical signal through the pedal displacement sensor when the brake pedal is operated and generate a hydraulic pressure;
a hydraulic pressure control unit including first and second hydraulic pressure circuits, each of which is connected to the pressure source through a hydraulic flow path and is configured to receive a hydraulic pressure generated from the pressure source and control a flow of the hydraulic pressure that is delivered to each of the wheel cylinders; and
an electronic control unit configured to control the pressure source and valves on the basis of hydraulic pressure information and pedal displacement information.

7. The electric brake system of claim 6, wherein the hydraulic pressure control unit is provided with a normally open (NO) type valve configured to control the flow of the hydraulic pressure delivered to each of the wheel cylinders, and a normally closed (NC) type valve configured to control a flow of a hydraulic pressure discharged from each of the wheel cylinders.

8. The electric brake system of claim 1, further comprising:
a first backup flow path configured to connect the first hydraulic port to a first hydraulic pressure circuit, and a second backup flow path configured to connect the second hydraulic port to a second hydraulic pressure circuit so as to directly deliver the oil to each of the wheel cylinders when the electric brake system operates abnormally;
a first cut valve provided at the first backup flow path and configured to control a flow of the oil; and
a second cut valve provided at the second backup flow path and configured to control a flow of the oil.

9. The electric brake system of claim 8, wherein the first and second cut valves are configured with normally open type solenoid valves that are usually open and are closed when a closing signal is received from an electronic control unit.

10. The electric brake system of claim 1, wherein the relief valve is configured to enable oil to flow when the simulation valve operates abnormally.

* * * * *